June 19, 1923.
B. J. YOUNG
TIRE TOOL
Filed April 19, 1919
1,459,490
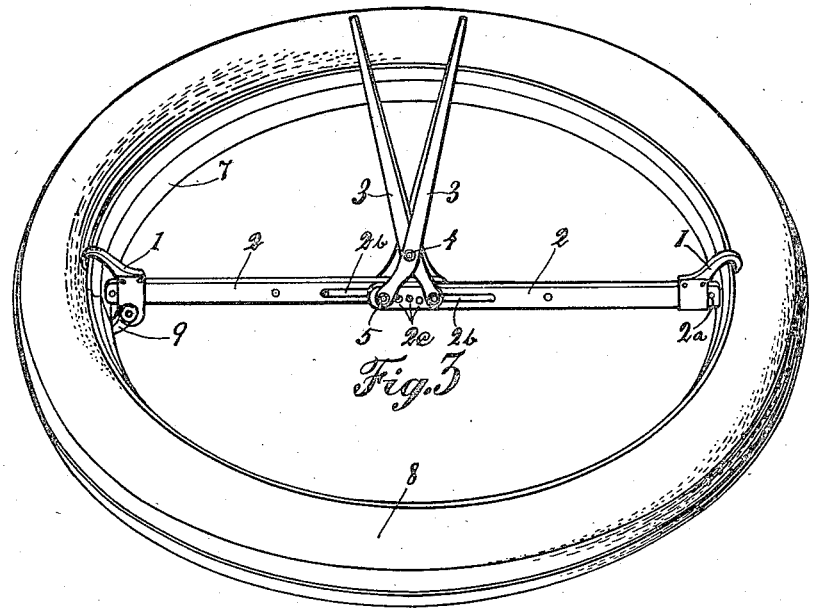

Patented June 19, 1923.

1,459,490

UNITED STATES PATENT OFFICE.

BENGT J. YOUNG, OF MINNEAPOLIS, MINNESOTA.

TIRE TOOL.

Application filed April 19, 1919. Serial No. 291,405.

*To all whom it may concern:*

Be it known that I, BENGT J. YOUNG, a citizen of the United States, residing at Minneapolis, in the county of Hennepin and State of Minnesota, have invented certain new and useful Improvements in Tire Tools; and I do hereby declare the following to be a full, clear, and exact description of the invention, such as will enable others skilled in the art to which it appertains to make and use the same.

My invention has for its object to provide an extremely simple and highly efficient tool especially adapted for use as a tire tool for expanding and contracting split demountable rims such as are in quite general use on automobiles; and to such ends, generally stated, the invention consists of the novel devices and combinations of devices hereinafter described and defined in the claims.

These split demountable rims, as is well known, are quite stiff spring steel structures which cannot be conveniently nor readily contracted or expanded as required for the removal of the rim from a tire and for the application of the rim to the tire. By the use of my improved tire tool, these demountable rims can be contracted and expanded with very great speed and ease, all as will hereinafter more fully appear.

As a distinctive feature, the thrust bars of the tool are made to slide one upon the other, that is, each bar affords a support and guide for the other so that the two bars can be given contracting and expanding movements only by straight line movements of the two bars. As a simple and very highly efficient means for moving these two bars, the one in respect to the other, I preferably employ a pair of crossed intermediately pivoted levers, the short ends of which are pivoted, one to each of said bars; and to make the bars adjustable as to normal length, the pivotally connected levers are of such construction and arrangement that when the bars are extended to the limit, the pivotal connection of said levers will be on a dead center with or slightly past a dead center in respect to the pivotal connections between the levers and the bars. On the outer end portions of the bars are rim-engaging hooks, and to make these adjustable to rims of different size or width, means are provided for adjustably connecting said hooks on said bars. This gives independent means for adjusting the length of the tire tool for rims of different diameter and for adjusting the hooks in respect to the extreme outer ends of the bars. The extreme outer ends of the bars afford shoulders for pressing against the interior of the demountable rim when the same is to be expanded by the use of the tool. This tool, while especially designed and particularly adapted for use as a tire tool, may, nevertheless, be put to various other uses and it is my intention to herein claim the same for all the uses for which it is capable.

In the drawings, which illustrate a commercial form of the improved tool, like characters indicate like parts throughout the several views.

Referring to the drawings:

Fig. 1 is an elevation illustrating the manner in which the folded tool can be placed in a box or container, said box or container being indicated by dotted lines;

Fig. 2 shows the tool in edge elevation with some parts in longitudinal section and with some parts broken away, the crossed levers being spread so as to contract the bars, that is, shorten the tool;

Fig. 3 is a perspective showing the tool in operative position on a demountable rim and ready for use to contract or expand said rim for the purpose of removing the same from the tire there shown in said view; and Fig. 4 is a view showing the tire and demountable rim in diametric section and showing the tire tool applied to the rim and positioned to contract the same.

In the drawings, the numeral 8 indicates an ordinary pneumatic tire and the numeral 7 a split spring demountable rim of well known construction.

The thrust bars 2 are overlapped side by side and these overlapped ends of said bars are formed with longitudinally spaced perforations $2^c$ and with long longitudinal slots $2^b$. The perforations $2^c$ of the one bar are aligned with the slots $2^b$ of the other bar so that nut-equipped pivot bolts 5 and 6 may be passed therethrough. The numeral 3 indicates a pair of crossed levers having bifurcated short ends pivotally connected at 4. The bifurcated end of the one lever is pivoted on one of the bolts 5 and 6 and the bifurcated end of the other lever is pivoted on the other bolt. Thus, the short ends of the two levers 3 are pivotally connected, each to one of the bars 4 and the two bolts 5 and 6, working in the slots 2ᵇ, hold the two bars 4 for straight line sliding movements, one upon the other. By placing the bolts 5 in different holes 2ᶜ, the tool made up of the bars 2 may be lengthened or shortened irrespective of movements of the levers 3. The bifurcated ends of the levers and the nut-equipped bolts 5 and 6 hold the overlapped ends of the bars 2 against separation while free for sliding movements. The short ends of the lever 3, it will be noted, afford a toggle connection between the two bars 2, in which the pivot 4 is movable to an extreme position shown in Fig. 4, where it is slightly beyond a dead center in respect to the pivot bolts 5 and 6. As shown, the bolt 6 is connected to the tool by a chain or the like to prevent the same from being lost when moved from working position for the purpose of re-adjusting or packing the tool.

Bolts or pins will be placed in certain outer end holes 2ᵃ. The rectangular sleeve-like portion of a hook 1 is mounted on the outer end of each bar 2 and is engageable with the pin or bolt in the hole 2ᵃ. One of the hooks 1 is shown as provided with a second hook 9 pivotally connected thereto for engagement with the opposite side of the demountable rim 7.

The use of the tool should be obvious from the foregoing description, but the following statements may be made:

For contracting a rim to remove the same from a tire, the hooks should be applied substantially as shown in Fig. 3, while the levers 3 are turned upward or moved together substantially as shown in said view. Then, when the levers are turned down or spread out as shown in Fig. 3, the hooks, at the opposite ends of the bars, will be drawn together and the rim contracted as shown in Fig. 4. Moreover, when the levers are turned down as shown in Fig. 4, they will be beyond a dead center and will tend to maintain that position so that the tire tool can then be used as a bar to lift the contracted rim out of the tire.

With the tool set and positioned within the rim, as shown in Fig. 3, the span of the bars 2, within the rim, may be increased as desired, by pressing the lever handles 3 together, thereby forcing the outer ends of said bars directly against the rim, thereby increasing its diameter and expanding the same so that its ends become unlapped and abutted or set adjacent to each other. It will be understood that the tool may be turned around to operate within any part of the rim, thus affording the operator means for applying rim-expanding force directly at the point where the best results can be obtained. It will also be understood that when the tool is once adjusted for a particular size of rim, it will be properly set for all operations on the rim, that is, for contracting the rim to a predetermined size and for spreading the same to the desired size so that the operator may readily replace the key plate of the rim.

Not only is the tool described highly efficient and capable of being quickly and easily used for the purposes stated, but is of extremely simple construction and of small cost. While the preferred embodiment of the invention is illustrated in the drawings and described, it will, of course, be understood that the tool is capable of modification within the spirit of the invention herein disclosed.

What I claim is:

1. In a tire tool, the combination of bars provided with rim-engaging hooks at their outer ends, and at their inner ends each having a hole and a slot, and crossed levers pivotally connected together and each pivoted at said hole in a bar by a bolt having a sliding connection in the slot of the other bar.

2. In a tire tool, the combination of bars provided with rim-engaging hooks, at the outer ends, and at their inner ends each with a hole and a slot, of crossed levers pivotally connected together and having bifurcated short ends embracing the overlapped ends of said bars, and bolts working in said slots and pivotally connecting the bifurcated ends of said levers to the holes in the ends of said bars.

In testimony whereof, I affix my signature in the presence of two witnesses.

BENGT J. YOUNG.

Witnesses:
E. FISKUM,
A. M. HANSEN.